Figure 1:
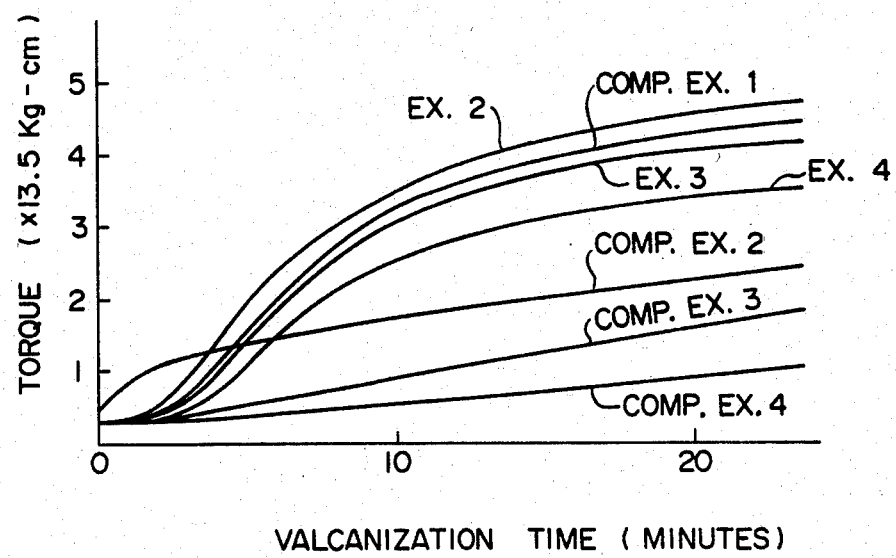

United States Patent [19]

Matoba et al.

[11] Patent Number: 4,511,698
[45] Date of Patent: Apr. 16, 1985

[54] CURABLE COMPOSITION OF EPICHLOROHYDRIN RUBBER AND ACRYLIC RUBBER AND CURED COMPOSITION THEREFROM

[75] Inventors: Yasuo Matoba, Toyonaka; Isao Ishimori, Kurashiki, both of Japan

[73] Assignee: Osaka Soda Co. Ltd., Osaka, Japan

[21] Appl. No.: 452,736

[22] Filed: Dec. 23, 1982

[30] Foreign Application Priority Data

Dec. 25, 1981 [JP] Japan ................. 56-213922

[51] Int. Cl.³ .............................................. C08L 63/00
[52] U.S. Cl. ...................................... 525/187; 525/913
[58] Field of Search .............................. 525/187, 913

[56] References Cited

U.S. PATENT DOCUMENTS

| | | | |
|---|---|---|---|
| 3,475,519 | 10/1969 | Noland | 525/187 |
| 4,072,734 | 2/1978 | Nakata | 525/187 |
| 4,251,648 | 2/1981 | Oetzel | 525/187 |
| 4,357,446 | 11/1982 | Matoba | 525/326.3 |

OTHER PUBLICATIONS

Nippon Gomu Kyokaishi, vol. 51, No. 5, pp. 287-288.

Primary Examiner—John C. Bleutge
Assistant Examiner—Robert E. L. Sellers, II
Attorney, Agent, or Firm—Sherman & Shalloway

[57] ABSTRACT

A curable composition of an epichlorohydrin rubber and an acrylic rubber composed of (1) 100 parts by weight of (a) 10–97% by weight of an epichlorohydrin rubber and (b) 3–90% by weight of an epoxy-containing acrylic rubber, (2) as a crosslinking agent, about 0.1 to about 10 parts by weight of a 2,3-dimercapto-pyrazine or -quinoxaline compound having the following formula

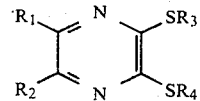

wherein $R_1$, $R_2$, $R_3$ and $R_4$ are as defined in claim 1 and (3) as an acid acceptor, about 0.1 to about 50 parts by weight of a compound of a metal of Group II or IVa of the periodic table.

10 Claims, 1 Drawing Figure

CURABLE COMPOSITION OF EPICHLOROHYDRIN RUBBER AND ACRYLIC RUBBER AND CURED COMPOSITION THEREFROM

This invention relates to a curable composition of an epichlorohydrin rubber and an acrylic rubber which can give a cured composition having excellent tensile strength characteristics, heat-aging resistance and permanent compression set at an industrially satisfactory rate of curing, and is free from the "softening degradation" which is a notable defect of epichlorohydrin rubber in use. This invention also relates to a cured composition obtained by curing said curable composition.

More specifically, this invention relates to a curable composition of an epichlorohydrin rubber and an acrylic rubber composed of (1) 100 parts by weight of (a) 10 to 97% by weight of an epichlorohydrin rubber and (b) 3 to 90% by weight of an epoxy-containing acrylic rubber, (2) as a crosslinking agent, about 0.1 to about 10 parts by weight of a 2,3-dimercapto-pyrazine or -quinoxaline compound having the following formula (I)

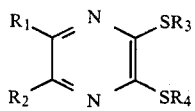

wherein $R_1$ and $R_2$ are identical or different and represent a hydrogen atom or a $C_1$–$C_8$ alkyl group, or $R_1$ and $R_2$ are bonded together to form a benzene ring which may be substituted by at least one substituent selected from the class consisting of halogen atoms, a nitro group, a carboxyl group, lower alkyl groups and lower alkoxy groups; and $R_3$ and $R_4$ are identical or different and represent a member selected from the class consisting of a hydrogen atom, alkali metals

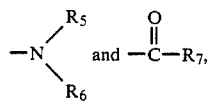

or $R_3$ and $R_4$ are bonded together to form $>C=O$, in which $R_5$ and $R_6$ are identical or different and represent a hydrogen atom or a $C_1$–$C_{12}$ group selected from the class consisting of alkyl groups, cycloalkyl groups, aryl groups and aralkyl groups, or $R_5$ and $R_6$ are bonded together with or without a hetero-atom other than the nitrogen atom to which they are bonded to form a 6-membered hetero-ring, and $R_7$ represents a $C_1$–$C_{18}$ group selected from the class consisting of alkyl groups, cycloalkyl groups, alkenyl groups, aryl groups and aralkyl groups, or $R_7$ represents

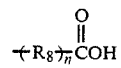

where n is 0 or 1 and when n is 1, $R_8$ represents a $C_1$–$C_8$ group selected from the class consisting of alkylene and alkenylene groups or a $C_6$–$C_{12}$ group selected from the class consisting of cycloalkylene and arylene groups, or $R_7$ represents

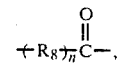

in which n and $R_8$ are the same as defined above and which is bonded to the thiol group of the 2,3-dimercaptopyrazine or -quinoxaline residual moiety through an ester linkage, the thiol group existing in the same molecule or another molecule of the residual moiety, and (3) as an acid acceptor, about 0.1 to about 50 parts by weight of a compound of a metal of Group II or IVa of the periodic table. The invention also relates to a cured composition obtained by curing said curable composition.

There has been known a curable composition of a halogen-containing polymer or copolymer composed of a halogen-containing polymer or copolymer including an epichlorohydrin rubber, 2,3-dimercapto-pyrazine or -quinoxaline compound as a crosslinking agent and a compound of a metal of Group II or IVa of the periodic table as an acid acceptor (Japanese Laid-Open Patent Publication No. 122865/1981 laid open on Sept. 26, 1981, and Japanese Laid-Open Patent Publication No. 122866/1981 laid open on Sept. 26, 1981; corresponding to U.S. Pat. No. 4,357,446 and west German O. L. S. No. DE3107941).

The above-cited patent documents fails to say anything about an epoxy-containing acrylic rubber which does not fall within the halogen-containing polymer or copolymer. The crosslinking agent disclosed in the above patent documents does not show a practical vulcanization rate for the epoxy-containing acrylic rubber. Naturally, therefore, prior art references including the above-cited patent documents are quite silent on a curable composition comprising a combination of the epoxy-containing acrylic rubber and the above crosslinking agent.

A composition composed of a mixture of an epichlorohydrin rubber and an epoxy-containing acrylic rubber, another cross-linking agent and an acid acceptor is generally known. For example, NIPPON GOMU KYOKAISHI (Journal of the Society of Rubber Industry, Japan), Vol. 51, No. 5, pages 287–288, § 4.2, 1978 describes a blend f an epichlorohydrin rubber and an epoxy-containing acrylic rubber. According to this publication, the blended composition has improved properties owing to the heat-aging resistance of the epoxy-containing acrylic rubber and the fuel oil resistance of the epichlorohydrin rubber, but the degree of vulcanization of this blended composition is extremely difficult to adjust, and the resulting cured product generally has poor permanent compression set. This publication describes ethylene-thiourea (EU) and dipentamethylene thiuram tetrasulfide (DPTT) as the other crosslinking agents.

The present inventors have made investigations in order to develop a practical composition of an epichlorohydrin rubber and an acrylic rubber being free from the aforesaid defects. These investigations have led to the discovery that a curable composition of an epichlorohydrin rubber and an epoxy-containing acrylic rubber consisting essentially of the aforesaid components (1), (2) and (3) can give a curable composition having excellent tensile strength characteristics, heat-aging resistance and permanent compression set smoothly at a practical high rate of vulcanization in spite of the fact that the crosslinking agent (2) does not exhibit a feasible rate of vulcanization for the epoxy-containing acrylic rubber, and in spite of the general thought that with the blend of the epichlorohydrin rubber and the epoxy-containing acrylic rubber, the degree of vulcanization would be extremely difficult to adjust and the resulting cured product has poor permanent compression set.

Degradation of rubber by heat-aging is of two types. The epichlorohydrin rubber exhibits "softening degradation", and has the defect that when used, for example, in packing materials, hoses, etc. it softens and flows out upon degradation and does not at all retain its original shape. On the other hand, the epoxy-containing acrylic rubber shows "curing degradation", and tends to become brittle on degradation as compared with the epichlorohydrin rubber. The degree of degradation is intermediate between a rubber showing "softening degradation" and a rubber showing "full curing degradation". It has been newly found in accordance with this invention that the composition of this invention consisting essentially of the components (1), (2) and (3) becomes a full curing degradation-type composition free from the trouble of the softening degradation.

It has also been found that in spite of the fact that the composition of this invention contains a combination of the epoxy-containing acrylic rubber and the crosslinking agent (2) which does not show a practical vulcanization rate for the acrylic rubber, and also includes the epichlorohydrin rubber having poor heat-aging resistance, the curable composition of the invention can give a cured composition having excellent heat-aging resistance, and permanent compression set under practicable vulcanization conditions whether the curable composition is rich in the epoxy-containing acrylic rubber or in the epichlorohydrin rubber.

It is an object of this invention therefore to provide an improved curable composition of an epichlorohydrin rubber and an epoxy-containing acrylic rubber.

The above and other objects and advantages of this invention will become more apparent from the following description and the accompanying drawing in which the single FIGURE represents a plot of cure curves for the compounds of Examples 2, 3 and 4 and Comparative Examples 1, 2, 3 and 4.

In the present invention, the rubber component (1) composed of (a) 10 to 97% by weight of an epichlorohydrin rubber and (b) 3 to 90% by weight of an epoxy-containing acrylic rubber is used.

Examples of preferred epichlorohydrin rubbers (a) are a homopolymer of epichlorohydrin, and copolymers of epichlorohydrin with epoxides such as ethylene oxide and allyl glycidyl ether. The epoxides may be used singly or in a combination of two or more. Thus, the epichlorohydrin rubber (a) is preferably selected from the group consisting of polyepichlorohydrin rubber, an epichlorohydrin/allyl glycidyl ether copolymer rubber, an epichlorohydrin/ethylene oxide copolymer rubber, an epichlorohydrin/ethylene oxide/allyl glycidyl ether terpolymer rubber, and mixtures of these. The amount of epichlorohydrin in the epichlorohydrin rubber or the copolymer with an epoxide may be properly selected. Copolymers containing at least about 20 mole% of epichlorohydrin are preferred. An example is a copolymer of epichlorohydrin and an epoxide in which the amount of epichlorohydrin is about 20 to about 99 mole%.

Specific examples of such preferred copolymers are a copolymer of 80 to 99 mole% of epichlorohydrin/1 to 20 mole% of allyl glycidyl ether, a copolymer of 25 to 90 mole% of epichlorohydrin/10 to 75 mole% of ethylene oxide, and a terpolymer of 26 to 80 mole% of epichlorohydrin/20 to 75 mole% of ethylene oxide/1 to 20 mole% of allyl glycidyl ether.

Examples of the epoxy-containing acrylic rubber (b) are epoxy-containing acrylic rubbers derived from
(i) an acrylate monomer of the following formula

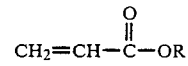

wherein R is a member selected from the class consisting of $C_1$-$C_{10}$ alkyl groups, $C_1$-$C_{10}$ cyanoalkyl groups, $C_2$-$C_{10}$ alkoxyalkyl groups, and $C_2$-$C_{10}$ alkylthioalkyl groups, and
(ii) at least one epoxy-containing monomer
selected from the group consisting of allyl glycidyl ether, glycidyl acrylate and glycidyl methacrylate; or epoxy-containing acrylic copolymer rubber derived from the acrylate monomer (i), the epoxy-containing monomer (ii), and (iii) a vinyl monomer free from halogen and having 2 to 10 carbon atoms which is other than the monomer (i).

Examples of the acrylate monomer (i) are methyl acrylate, ethyl acrylate, propyl acrylate, butyl acrylate, 2-ethylhexyl acrylate, methoxymethyl acrylate, methoxyethyl acrylate, ethoxyethyl acrylate, butoxyethyl acrylate, methylthioethyl acrylate, hexylthioethyl acrylate, cyanoethyl acrylate, cyanobutyl acrylate, and cyanooctyl acrylate.

Examples of the vinyl monomer (iii) include vinyl acetate, lower alkyl ($C_1$-$C_4$) esters of methacrylic acid (e.g., methyl methacrylate), styrene, $C_1$-$C_2$ lower alkylstyrenes (e.g., methylstyrene), acrylonitrile and acrylamide.

A preferred example of the epoxy-containing acrylic rubber derived from the components (i) and (ii) and optionally together with the component (iii) is an epoxy-containing acrylic rubber derived from 40 to 99.5% by weight of the acrylate monomer (i), 0.5 to 30% by weight of the epoxy-containing monomer (ii) and 0 to 40% by weight of the vinyl monomer (iii), the total proportion of the components (i), (ii) and (iii) being 100% by weight.

In the present invention, there is used the rubber component (1) consisting of (a) 10 to 97% by weight of the epichlorohydrin rubber and (b) 3 to 90% by weight of the epoxy-containing acrylic rubber. If either one of the components (a) and (b) is lacking or the amount of the component (a) and/or the component (b) is too large or small, it is difficult to achieve the unexpected excellent properties of the composition of this invention. Accordingly, the rubber component (1) composed of (a) and (b) in the proportions within the above-specified ranges is used.

In the composition of this invention, about 0.1 to about 10 parts by weight of a 2,3-dimercapto-pyrazine or -quinoxaline compound having the aforesaid formula (I) is used as a crosslinking agent per 100 parts by weight of the rubber component (1). Such a crosslinking agent is known and disclosed in the above cited Japanese Laid-Open Patent Publications Nos. 122865/1981 and 122866/1981, and all crosslinking agents disclosed in these patent documents can be used in this invention.

Preferred 2,3-dimercapto-pyrazine or -quinoxaline compounds used in this invention are represented by the following formula

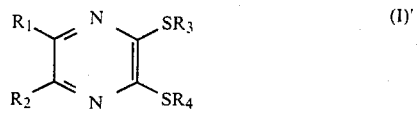

wherein $R_1$ and $R_2$ are identical or different and represent a hydrogen atom or a $C_1$-$C_8$ alkyl group, or $R_1$ and $R_2$ are bonded together to form a benzene ring which may be substituted by at least one substituent selected from the class consisting of halogen atoms, a nitro group, a carboxyl group, lower alkyl groups and lower alkoxy groups; and $R_3$ and $R_4$ are identical or different and represent a member selected from the class consisting of a hydrogen atom,

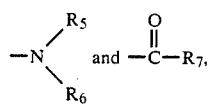

or $R_3$ and $R_4$ are bonded together to form $>C=O$, in which $R_5$ and $R_6$ are identical or different and represent a hydrogen atom or a $C_1$-$C_{12}$ group selected from the class consisting of alkyl groups and cycloalkyl groups and $R_7$ represents a $C_1$-$C_{18}$ group selected from the class consisting of alkyl groups and aryl groups or $R_7$ represents

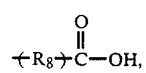

wherein $R_8$ represents a $C_1$-$C_8$ alkylene group.

Specific examples of the crosslinking agent (2) include 2,3-dimercaptopyrazine, pyrazine-2,3-dithiocarbonate, 5-methyl-2,3-dimercaptopyrazine, 5-ethylpyrazine-2,3-dithiocarbonate, 5,6-dimethyl-2,3-dimercaptopyrazine, 5,6-dimethylpyrazine-2,3-dithiocarbonate, N-methyl-3(2-mercaptopyrazyl)sulfenamide, N,N'-dicyclohexyl-3(5-ethyl-2-mercaptopyrazyl)-sulfenamide, 5-isopropyl-2-mercaptopyrazyl-3-thiol acetate, 5-methyl-2-mercaptopyrazyl-3-thiol benzoate, 5,6-dimethyl-2-mercaptopyrazyl-3-thiol sebacate, 2,3-dimercaptoquinoxaline, quinoxaline-2,3-dithiocarbonate, 6-ethyl-2,3-dimercaptoquinoxaline, 6-methylquinoxaline-2,3-dithiocarbonate, 6,7-di(n-butyl)-2,3-dimercaptoquinoxaline, N,N'-dicyclohexyl-3(2-mercaptoquinoxalyl)sulfenamide, N-(n-butyl)-3-(6-methyl-2-mercaptoquinoxalyl)-sulfenamide, 6-isopropyl-2-mercaptoquinoxalyl-3-thiol acetate, 5,8-demethyl-2-mercaptoquinoxalyl-3-thiol benzoate, 6-isobutyl-2-mercaptoquinoxalyl-3-thiol sebacate, 6-bromo-2,3-dimercaptoquinoxaline, 6-methoxyquinoxaline-2,3-dithiocarbonate, 6-nitro-2,3-dimercaptoquinoxaline, and 6-carboxyquinoxaline-2,3-dithiocarbonate.

The compound (2) of a metal of group II or IVa of the periodic table is further included as an acid acceptor in the composition of this invention in an amount of 0.1 to about 50 parts by weight per 100 parts by weight of the rubber component (1).

The metal compounds as an acid acceptor include oxides, hydroxides, carbonates, carboxylates, silicates, borates, and phosphites of metals of Group II of the periodic table, preferably Mg, Ba, Ca and Zn; and oxides, basic carbonates, basic carboxylates, basic phosphites, basic sulfites, and tribasic sulfates of metals of Group IVa of the periodic table, preferably Sn and Pb. Specific examples are magnesia, magnesium hydroxide, barium hydroxide, magnesium carbonate, barium carbonate, quick lime, slaked lime, calcium carbonate, calcium silicate, calcium stearate, zinc stearate, calcium phthalate, magnesium phosphite, calcium phosphite, zinc oxide, tin oxide, litharge, red lead, white lead, dibasic lead phthalate, dibasic lead carbonate, tin stearate, basic lead phosphite, basic tin phosphite, basic lead sulfite, and tribasic lead sulfate.

The curable composition of this invention composed of 100 parts by weight of the rubber component (1), about 0.1 to about 10 parts by weight, preferably about 0.3 to about 5 parts by weight, of 2,3-dimercaptopyrazine or -quinoxaline compound of formula (I) as a crosslinking agent, and about 0.5 to about 50 parts by weight, preferably about 0.5 to about 30 parts by weight, more preferably about 1 to about 20 parts by weight, of the compound of a metal of Group II or IVa of the periodic table as an acid acceptor.

When the amount of the crosslinking agent (2) is too small below the specified limit, the crosslinking effect is insufficient, and when it far exceeds the upper limit specified, the resulting cured product is comparatively brittle. When the amount of the acid acceptor (3) is too small below the specified limit, the resulting cured product has poor resistance to heat deterioration, and when it far exceeds the upper limit, the mechanical properties such as tensile strength and elongation of the resulting cured product are degraded.

In addition to the aforesaid three essential ingredients (1), (2) and (3), the curable composition of this invention may further include other additives conventionally used in the art.

Examples of such additives include organic or inorganic fillers such as calcium carbonate, clay, talc, diatomaceous earth, ferrite, mica powder, barium sulfate, graphite, glass fibers, cork powder and wood flour; reinforcing agents such as carbon black, silica, calcium silicate and basic magnesium carbonate; plasticizers such as dioctyl phthalate, diisodecyl adipate, chlorinated paraffin and process oils for rubbers; processing aids such as paraffin wax and stearic acid; antioxidants such as polymerized trimethyl dihydroquinoline, 2,6-di-tert-butyl-4-methyl-phenol and dilauryl thiodipropionate; coloring agents such as titanium oxide, red iron oxide and ultramarine; and fire retarding agents such as antimony trioxide, aluminum hydroxide, zinc borate, tris(chloroethyl)phosphate and tetrabromobisphenols.

The amount of these additives per 100 parts by weight of the rubber component (1) are up to about 1000 parts by weight for the fillers; up to about 200 parts by weight for the reinforcing agents; up to about 100 parts by weight for the plasticizers; up to about 10 parts by weight for the processing aids; up to about 5 parts by weight for the antioxidants; up to about 50 parts by weight for the coloring agents; and up to about 50 parts by weight for the fire retardants.

The composition of this invention may further include a vulcanization accelerator, the use of which is preferred for epichlorohydrin rubber having relatively low reactivity such as polyepichlorohydrin rubber and an epichlorohydrin/alkylglycidyl ether copolymer rubber.

Examples of the vulcanization accelerator are elementary sulfur, thiuram sulfides, dithiocarbamates, sulfenamides, amines or salts thereof such as aliphatic or aromatic amines, salts of weak acids such as 2-mercaptobenzothiazole, phthalic acid or benzoic acid with these amines, addition products of these amines with alcohols or oximes, for example adducts with cyclohexyl alcohol, or cyclohexanoneoxime, and basic silicas.

Specific examples of these vulcanization accelerators are dipentamethylenethiuram tetrasulfide, tetramethylthiuram mono- or di-sulfide, cadmium pentamethylenedithiocarbamate, tellurium dimethyldithiocarbamate, piperidine pentamethylenedithiocarbamate, cyclohexylamine, dibutylamine, dibutylammonium oleate, diphenyl guanidine, di-ortho-tolyl guanidine, acetaldehyde/aniline condensation products, butyraldehyde/aniline condensation products, N-cyclohexyl-2-benzothiazylsulfenamide, N,N'-dicyclohexyl-2-benzothiazyl sulfenamide, and a dicyclohexylamine salt of 2-mercaptobenzothiazole.

The amount of the vulcanization accelerator is not particularly critical, but is preferably about 0.1 to about 6 parts by weight per 100 parts by weight of the rubber component (1).

When the 2,3-dimercapto-pyrazine or -quinoxaline compound of formula (I) in the composition of this invention is an ester such as monothiolcarboxylic acid esters, dithioldicarboxylic acid esters, and pyrazine- or quinoxaline-2,3-dithiocarbonates, the addition of a vulcanization aid such as carboxylic acids, phenols, polyols or thiols is conducive to very rapid vulcanization rates. Examples of such vulcanization aids are lauric acid, benzoic acid, salicylic acid, gallic acid, catechol, pyrogallol, diethylene glycol, pentaerythritol, trimethylolpropane, trimethylolethane, sorbitol, bisphenol A, mercaptobenzothiazole, and mercaptobenzimidazole. The amount of the vulcanization aid is, for example, about 0.1 to about 10 parts by weight, preferably about 0.3 to about 6 parts by weight, per 100 parts by weight of the rubber component (1).

In order to impart excellent processing safety in addition to rapid vulcanization rates, there may be incorporated a vulcanization retarder of the following formula

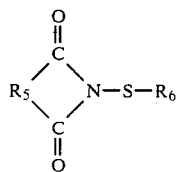

wherein $R_5$ and $R_6$, independently from each other, represent a $C_1$–$C_{20}$ aliphatic, alicyclic or aromatic hydrocarbon group.

Examples of the vulcanization retarder include N-cyclohexylthiophthalimide, N-cyclohexylthiosuccinimide, N-cyclohexylthiomaleimide, N-dodecylthiophthalimide, N-dodecylthiosuccinimide, N-dodecylthiomaleimide, N-phenylthiophthalimide, N-phenylthiosuccinimide, and N-phenylthiomaleimide. The amount of the vulcanization retarder is, for example, about 0.1 to about 5 parts by weight, preferably about 0.2 to about 2 parts by weight, per 100 parts by weight of the rubber component (1).

The curable composition of this invention can be prepared by uniformly blending 100 parts by weight of the rubber component (1), about 0.1 to about 10 parts by weight of the 2,3-dimercapto-pyrazine or -quinoxaline compound as a crosslinking agent (2), about 0.5 to about 50 parts by weight of the metal compound as an acid acceptor (3), and optionally the other additives exemplified hereinabove. Blending can be effected by using known blending devices such as a mixing roll, a Banbury mixer, and various kneaders such as a pressure-type kneader. The blending temperature that can be employed is about 50° to about 100° C. for the curing agent and accelerator, and about 60° to about 200° C. for the other compounding agents.

The composition of this invention can be cured by heating it to a temperature of, say, about 100° C. to about 200° C. The heating time can be chosen properly, and may, for example, be about 0.1 to 300 minutes. Curing of the composition can be performed by any desired methods such as press-forming under heat in a mold, injection molding, and heat molding using a steam can, an air bath, an infrared ray, or microwaves.

The following examples illustrate the present invention more specifically. In these examples, the amounts of the various components are expressed in parts by weight unless otherwise specified.

EXAMPLES 1 TO 8 AND COMPARATIVE EXAMPLES 1 TO 4

In each run, the ingredients shown in Table 1 were kneaded on an open roll at 60° to 70° C. The resulting sheet was placed in a mold, and molded under pressure at 155° C. and 80 kg/cm² for 30 minutes. The vulcanizate obtained was tested for the various properties shown in Table 2. The results are shown in Table 2.

The cure curves of the compounds obtained in Examples 2, 3 and 4 and Comparative Examples 1, 2, 3 and 4 were measured at an amplitude angle of 3° and a temperature of 155° C. using a JSR-type curelastometer. The results are plotted in FIG. 1.

TABLE 1

| | Comp. Example 1 | Example 1 | Example 2 | Comp. Example 2 | Example 3 | Example 4 | Comparative Example 3 | Comparative Example 4 | Example 5 | Example 6 | Example 7 | Example 8 |
|---|---|---|---|---|---|---|---|---|---|---|---|---|
| Polyepichlorohydrin rubber | 100 | 95 | 70 | 70 | 50 | 15 | 5 | | | | | 40 |
| Epichlorohydrin-allyl glycidyl ether copolymer rubber (*1) | | | | | | | | | 70 | | | |
| Epichlorohydrin-ethylene oxide copolymer rubber (*2) | | | | | | | | | | 70 | 40 | |
| Epichlorohydrin-ethylene oxide-allyl glycidyl ether rubber (*3) | | | | | | | | | | | 50 | |
| Epoxy-containing acrylic rubber | | 5 | 30 | 30 | 50 | 85 | 95 | 100 | 30 | | | |

TABLE 1-continued

|  | Comp. Example 1 | Example 1' | Example 2 | Comp. Example 2 | Example 3 | Example 4 | Comparative Example 3 | Comparative Example 4 | Example 5 | Example 6 | Example 7 | Example 8 |
|---|---|---|---|---|---|---|---|---|---|---|---|---|
| (*4) |  |  |  |  |  |  |  |  |  |  |  |  |
| Epoxy-containing acrylic rubber (*5) |  |  |  |  |  |  |  |  | 30 |  | 50 | 20 |
| FEF carbon black (reinforcing agent) | 40 | 40 | 40 | 40 40 | 40 | 40 | 40 | 40 | 40 | 40 | 40 |  |
| Sorbitan monostearate (processing aid) | 2 | 2 | 2 | 2 | 2 | 2 | 2 | 2 | 2 | 2 | 2 | 2 |
| Nickel dibutyl dithiocarbamate (antioxidant) | 1.5 | 1.5 | 1.5 | 1.5 | 1.5 | 1.5 | 1.5 | 1.5 | 1.5 | 1.5 | 1.5 | 1.5 |
| Calcium hydroxide | 3 | 3 | 3 | 3 | 3 | 3 | 3 | 3 |  | 1 | 3 |  |
| Calcium silicate |  |  |  |  |  |  |  |  | 5 |  |  | 5 |
| Magnesium oxide |  |  |  |  |  |  |  |  |  | 10 |  |  |
| Basic silica ("Carplex #1120", a product of Shionogi Seiyaku) |  |  |  |  |  |  |  |  |  |  | 1 |  |
| Butyraldehyde-aniline condensate (Nocceller #8, of Ouchi Shinko) | 0.3 | 0.3 | 0.3 |  | 0.3 | 0.3 | 0.3 | 0.3 | 0.3 |  |  |  |
| Pentaerythritol | 0.5 | 0.5 | 0.5 |  | 0.5 | 0.5 | 0.5 | 0.5 |  |  | 0.5 |  |
| 2,3-Dimercaptopyrazine |  |  |  |  |  |  |  |  | 0.8 |  |  |  |
| N,N—dicyclohexyl-3(5-ethyl-2-mercaptopyrazyl)sulfenamide |  |  |  |  |  |  |  |  |  | 3 |  |  |
| 5-iso-Propyl-2-mercaptopyrazyl-5-iso-Propyl-2-mercaptopyrazyl-3-thiol acetate |  |  |  |  |  |  |  |  |  |  | 1.5 | sulfenamide |
| 2,3-Dimercaptoquinoxaline |  |  |  |  |  |  |  |  |  |  |  | 1 |
| 6-Methylquinoxaline-2,3-dithiocarbonate | 1.2 | 1.2 | 1.2 |  | 1.2 | 1.2 | 1.2 | 1.2 |  |  |  |  |
| 2-Mercaptoimidazoline |  |  |  | 1.2 |  |  |  |  |  |  |  |  |

(*1) 92 mole % of epichlorohydrin and 8 mole % of allyl glycidyl ether
(*2) 50 mole % of epichlorohydrin and 50 mole % of ethylene oxide
(*3) 45 mole % of epichlorohydrin, 49 mole % of ethylene oxide, and 6 mole % of allyl glycidyl ether
(*4) 98% by weight of ethyl acrylate and 2% by weight of allyl glycidyl ether
(*5) 60% by weight of ethyl acrylate, 20% by weight of butyl acrylate, 16% by weight of methoxyethyl acrylate, and 4% by weight of glycidyl acrylate

TABLE 2

|  | Comparative Example 1 | Example 1 | Example 2 | Comp. Example 2 | Example 3 | Example 4 | Comp. Example 3 | Comp. Example 4 | Example 5 | Example 6 | Example 7 | Example 8 |
|---|---|---|---|---|---|---|---|---|---|---|---|---|
| Basic properties |  |  |  |  |  |  |  |  |  |  |  |  |
| 300% Modulus (kg/cm$^2$) | 89 | 94 | 120 | 57 | 115 | 82 | 58 | 46 | 105 | 110 | 100 | 105 |
| Tensile strength (kg/cm$^2$) | 136 | 139 | 135 | 110 | 125 | 116 | 80 | 56 | 144 | 142 | 147 | 138 |
| Elongation at break (%) | 600 | 580 | 435 | 700 | 430 | 480 | 510 | 510 | 440 | 470 | 400 | 470 |
| Hardness (JISA) | 69 | 68 | 69 | 62 | 68 | 66 | 58 | 54 | 65 | 68 | 65 | 66 |
| Permanent compression set (%) (120° C. × 70 hours; 25% compression) | 36 | 33 | 30 | 71 | 36 | 39 | 67 | 74 | 34 | 29 | 33 | 37 |
| Oil resistance, Degree of swelling in volume (%) (dipped in fuel oil B at 25° C. for 70 hours) | 22 | 24 | 29 | 37 | 38 | 49 | 63 | 74 | 35 | 30 | 43 | 28 |
| Heat-aging resistance (Geer's oven, 170° C. × 240 hours) | Measurement impossible because of softening |  |  |  |  |  |  |  |  |  |  |  |
| Percent change in tensile strength (%) |  | −34 | −28 | −44 | −15 | −4 | +10 | +13 | −14 | −44 | −30 | −30 |
| Percent change in elongation at break (%) |  | −64 | −74 | −90 | −69 | −62 | −58 | −56 | −82 | −60 | −80 | −67 |
| Change in hardness (point) | +7 | +11 | −1 | +12 | +10 | +12 | +14 | +25 | +6 | +19 | +10 |  |
| Hardness (JISA) |  | 75 | 80 | 61 | 80 | 76 | 70 | 68 | 90 | 74 | 84 | 76 |

What is claimed is:

1. A curable composition of an epichlorohydrin rubber and an acrylic rubber composed of (1) 100 parts by weight of (a) 10–97% by weight of an epichlorohydrin rubber and (b) 3–90% by weight of an epoxy-containing acrylic rubber, (2) as a crosslinking agent, about 0.1 to about 10 parts by weight of a 2,3-dimercaptopyrazine or -quinoxaline compound having the following formula

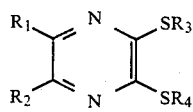

wherein $R_1$ and $R_2$ are identical or different and represent a hydrogen atom or a $C_1$-$C_8$ alkyl group, or $R_1$ and $R_2$ are bonded together to form a benzene ring which may be substituted by at least one lower alkyl group; and $R_3$ and $R_4$ are identical or different and represent a member selected from the class consisting of a hydrogen atom,

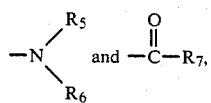

or $R_3$ and $R_4$ are bonded together to form $>C=O$, in which $R_5$ and $R_6$ are identical or different and represent a hydrogen atom, a $C_1$-$C_{12}$ alkyl group or a cyclohexyl group and $R_7$ represents a $C_1$-$C_{18}$ alkyl group or

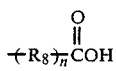

where $R_8$ represents a $C_1$-$C_8$ alkylene group, and (3) as an acid acceptor, about 0.1 to about 50 parts by weight of a compound of a metal of Group II or IVa of the periodic table.

2. The composition of claim 1 wherein said epichlorohydrin rubber (a) is selected from the group consisting of polyepichlorohydrin rubber, an epichlorohydrin/allyl glycidyl ether copolymer rubber, an epichlorohydrin/ethylene oxide copolymer rubber, an epichlorohydrin/ethylene oxide/allyl glycidyl ether terpolymer rubber and mixtures thereof.

3. The composition of claim 1 wherein said acrylic rubber (b) is an epoxy-containing acrylic copolymer rubber derived from (i) an acrylate monomer of the following formula

wherein R is a member selected from the class consisting of $C_1$-$C_{10}$ alkyl groups, $C_1$-$C_{10}$ cyanoalkyl groups, $C_2$-$C_{10}$ alkoxyalkyl groups, and $C_2$-$C_{10}$ alkylthioalkyl groups, and (ii) at least one epoxy-containing monomer selected from the group consisting of allyl glycidylether, glycidylacrylate and glycidylmethacrylate or an epoxy-containing acrylic copolymer rubber derived from the acrylate monomer (i), the epoxy-containing monomer (ii) and (iii) a vinyl monomer free from a halogen and having 2 to 10 carbon atoms other than the monomer (i).

4. The composition of claim 1 wherein said crosslinking agent (2) is a 2,3-dimercapto-pyrazine or -quinoxaline compound selected from the group consisting or 2,3-dimercaptopyrazine, pyrazine-2,3-dithiocarbonate, 5-methyl-2,3-dimercaptopyrazine, 5-ethylpyrazine-2,3-dithiocarbonate, 5,6-dimethyl-2,3-dimercaptopyrazine, 5,6-dimethylpyrazine-2,3-dithiocarbonate, N-methyl-3(2-mercaptopyrazyl)sulfenamide, N,N'-dicyclohexyl-3(5-ethyl-2-mercaptopyrazyl)sulfenamide, 5-isopropyl-2-mercaptopyrazyl-3-thiol acetate, 5,6-dimethyl-2-mercaptopyrazyl-3-thiol sebacate, 2,3-dimercaptoquinoxaline, quinoxaline-2,3-dithiocarbonate, 6-ethyl-2,3-dimercaptoquinoxaline, 6p-methylquinoxaline-2,3-dithiocarbonate, 6,7-di(n-butyl)-2,3-dimercaptoquinoxaline, N,N'-dicyclohexyl-3-(2-mercaptoquinoxalyl)sulfenamide, N-(n-butyl)-3-(6-methyl-2-mercaptoquinoxalyl)sulfenamide, 6-isopropyl-2-mercaptoquinoxalyl-3-thiol acetate, and 6-isobutyl-2-mercaptoquinoxalyl-3-thiol sebacate.

5. A cured composition obtained by curing the curable composition of claim 1.

6. The composition of claim 1 wherein the component (1) is rich in the epichlorohydrin rubber (a).

7. The composition of claim 1 wherein the component (1) is rich in the epoxy-containing acrylic rubber (b).

8. The composition of claim 4 wherein said epichlorohydrin rubber (a) is selected from the group consisting of polyepichlorohydrin rubber, an epichlorohydrin/allyl glycidyl ether copolymer rubber, an epichlorohydrin/ethylene oxide copolymer rubber, an epichlorohydrin/ethylene oxide/allyl glycidyl ether terpolymer rubber and mixtures thereof; and wherein said acrylic rubber (b) is an epoxy-containing acrylic copolymer rubber derived from (i) an acrylate monomer of the following formula

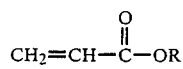

wherein R is a member selected from the class consisting of $C_1$-$C_{10}$ alkyl groups, $C_1$-$C_{10}$ cyanoalkyl groups, $C_2$-$C_{10}$ alkoxyalkyl groups, and $C_2$-$C_{10}$ alkylthioalkyl groups, and (ii) at least one epoxy-containing monomer selected from the group consisting of allyl glycidylether, glycidylacrylate and glycidylmethacrylate or an epoxy-containing acrylic copolymer rubber derived from the acrylate monomer (i), the epoxy-containing monomer (ii) and (iii) a vinyl monomer free from a halogen and having 2 to 10 carbon atoms other than the monomer (i).

9. A cured composition obtained by curing the curable composition of claim 6.

10. A cured composition obtained by curing the curable composition of claim 7.

* * * * *

UNITED STATES PATENT AND TRADEMARK OFFICE
CERTIFICATE OF CORRECTION

PATENT NO. : 4,511,698
DATED : April 16, 1985
INVENTOR(S) : Matoba, et al.

It is certified that error appears in the above-identified patent and that said Letters Patent is hereby corrected as shown below:

Claim 4, line 3, delete "or" and insert -- of --, line 13, delete "6p-methylquinoxaline" and insert -- 6-methylquinoxaline --.

Signed and Sealed this

Twenty-seventh Day of August 1985

[SEAL]

Attest:

DONALD J. QUIGG

Attesting Officer

Acting Commissioner of Patents and Trademarks